United States Patent [19]
Llewellyn et al.

[11] Patent Number: 5,778,131
[45] Date of Patent: *Jul. 7, 1998

[54] ASSEMBLY FOR USE IN CONNECTING OPTICAL FIBRES INCLUDING A MANIFOLD DEVICE

[75] Inventors: Laurence Llewellyn, Chepstow Gwent; Mark George Graveston, Gwent; Simon Charles Tristan Benton, Felixstowe; Ispran Sharma Kandasamy, Newport Gwent; Peter George Hale, Bristol; Peter David Jenkins, Woodbridge, all of England

[73] Assignee: Pirelli General PLC, London, England

[*] Notice: The term of this patent shall not extend beyond the expiration date of Pat. No. 5,740,299.

[21] Appl. No.: 624,365

[22] PCT Filed: Sep. 28, 1994

[86] PCT No.: PCT/GB94/02112

§ 371 Date: Mar. 28, 1996

§ 102(e) Date: Mar. 28, 1996

[87] PCT Pub. No.: WO95/09375

PCT Pub. Date: Apr. 6, 1995

[30] Foreign Application Priority Data

Sep. 29, 1993 [GB] United Kingdom .................. 9320101

[51] Int. Cl.[6] ............................................. G02B 6/00
[52] U.S. Cl. ................................... 385/135; 385/137
[58] Field of Search ............................... 385/134–139

[56] References Cited

U.S. PATENT DOCUMENTS

| | | |
|---|---|---|
| 4,373,776 | 2/1983 | Purdy .................................. 350/96.2 |
| 4,752,110 | 6/1988 | Blanchet et al. ...................... 350/96.2 |
| 5,187,766 | 2/1993 | Finzel et al. ......................... 385/135 |
| 5,548,678 | 8/1996 | Frost et al. .......................... 385/137 |

FOREIGN PATENT DOCUMENTS

| | | | |
|---|---|---|---|
| 0 356 942 A2 | 3/1990 | European Pat. Off. | G02B 6/36 |
| 0 370 819 A1 | 5/1990 | European Pat. Off. | G02B 6/36 |
| 0 215 668 A2 | 3/1992 | European Pat. Off. | G02B 6/44 |
| 2678076A1 | 12/1992 | France | G02B 6/38 |
| 2255652 | 11/1992 | United Kingdom | G02B 6/36 |
| WO 89/05989 | 6/1989 | WIPO | G02B 6/44 |
| WO 90/05927 | 5/1990 | WIPO | G02B 6/00 |
| WO 91/10927 | 7/1991 | WIPO | G02B 6/36 |

OTHER PUBLICATIONS

International Search Report for PCT/GB 94/02112 dated Feb. 8, 1995.

U.K. Search Report for GB 9320101.0 dated Feb. 3, 1994.

*Primary Examiner*—Phan T. H. Palmer
*Attorney, Agent, or Firm*—Finnegan, Henderson, Farabow, Garrett & Dunner L.L.P.

[57] ABSTRACT

An assembly 10 for use in connecting optical fibers to an optical fiber device having input and output tails includes a plurality of housings 12 for housing optical fiber connections and a housing 18 for housing at least one passive optical device. The tails of the one or more devices are routed through manifold 16 to the housings 12 via respective routing members 14 and the optical fibers to be connected to the tails are routed to the appropriate housings 12 via these routing members 14. The housings 12 are arranged in an aligned bank adjacent the manifold 16 and each housing 12 is moveable out of such alignment for providing access thereto.

14 Claims, 7 Drawing Sheets

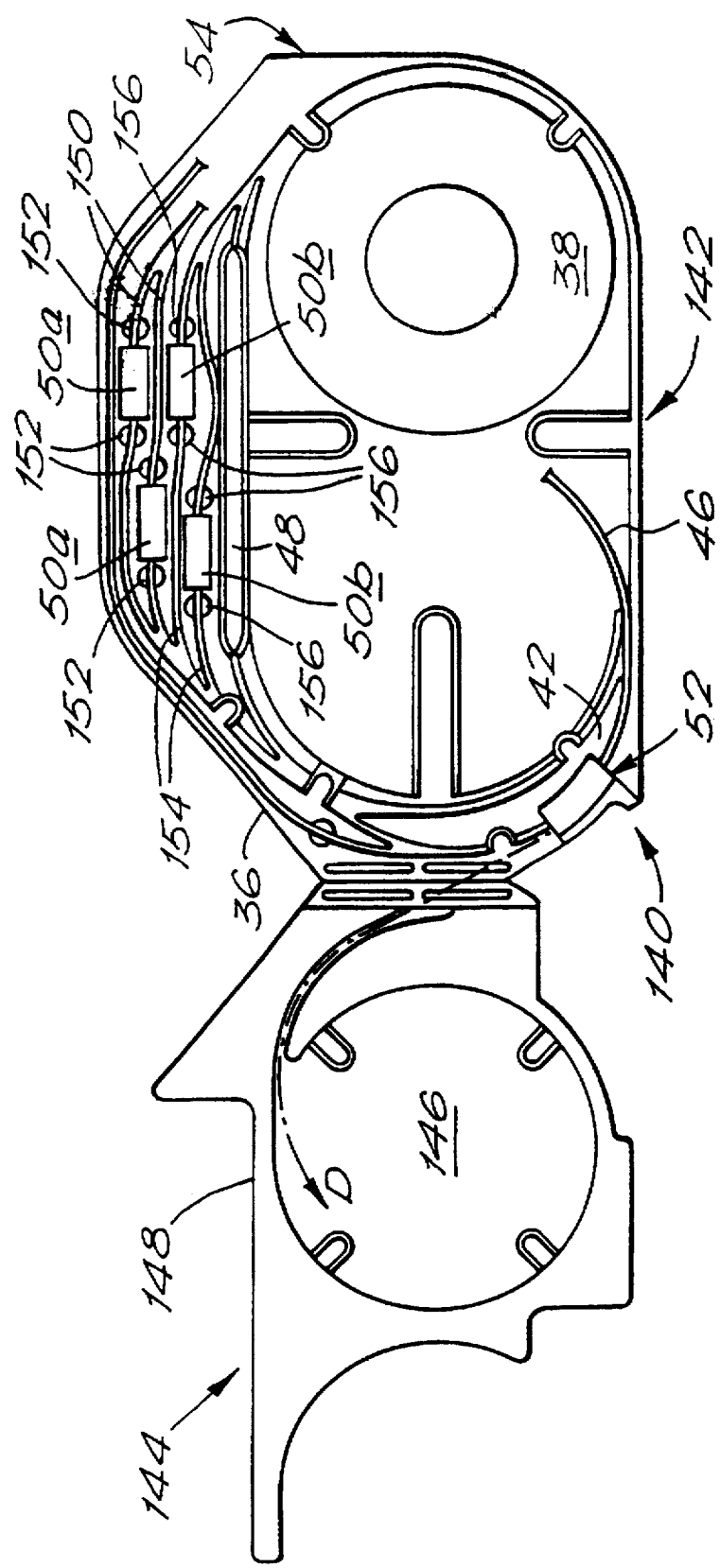

ASSEMBLY FOR USE IN CONNECTING OPTICAL FIBRES INCLUDING A MANIFOLD DEVICE

BACKGROUND OF THE INVENTION

This invention relates to the connection of optical fibres and in particular to an assembly provided with a plurality of housings for housing associated optical fibre connections.

Such assemblies are known, for example, from U.S. Pat. No. 5,187,766, and EP 0370819A in each of which such housings are disposed in an aligned bank with each housing being movable out of alignment with the other housings to provide access to the optical fibre connection or connections therein.

The assemblies disclosed in the above-mentioned specifications (i) are inefficient in their use of space, which is a disadvantage when the assembly needs to be accommodated in locations where space is limited, and (ii) have a construction which restricts the number of housings they can incorporate, which is a disadvantage when assemblies with different numbers of housings are required.

An object of the present invention is to enable at least one of the above-mentioned disadvantages to be overcome.

SUMMARY OF THE INVENTION

The invention includes an assembly for use in connecting optical fibres to at least one optical device having input and output tails, comprising first housings for housing connections between the optical fibres and tails, a further housing having means for locating therein said at least one optical device, and routing means for guiding said optical fibre tails from said further housing to said first housings, said routing means including a manifold device providing tracks for routing said tails between said further housing and said first housings over predetermined paths, said first housings being arranged in an aligned bank adjacent said manifold device with each first housing being moveable out of such alignment with the others for providing access thereto.

Preferably each of said first housings is mounted to a respective routing member having passage means for routing thereto fibre tails from said manifold device and optical fibres to be connected to said tails in said first housing.

It will be appreciated that since each first housing is mounted to, and supported by, its associated routing member, the number of first housings in the assembly may be varied to suit requirements. Also, since the routing members are connected together such that the first housings are arranged in an aligned bank, the space occupied by the first housings in an assembly may be minimised for the number of first housings in that assembly.

Each first housing may be pivotally mounted to its respective routing member for movement into and out of alignment with the other first housings in said aligned bank, a respective flexible conduit means being provided between each said routing member and associated first housing for routing optical fibres and optical fibre tails therebetween and having a predetermined minimum bend radius during such pivotal movement.

It will be appreciated that by arranging for each flexible conduit means to have a minimum bend radius during pivotal movement of the first housing associated with it, the bend radius of the optical fibres in the flexible conduit can be maintained above a predetermined value.

The pivotal mounting of each first housing to its respective routing member may be by a pivoting device which is connected for movement relative to said routing member and said first housing by first and second connections respectively, at least one of said connections being a pivotal connection, and in the embodiment described hereinafter both connections are pivotal with the axis of the first pivotal connection being parallel to the axis of the second pivotal connection.

The use of these pivoting devices enables access to be gained to each first housing by pivoting through a smaller angle than would be required if each first housing were pivoted to a routing member about a single axis. This is advantageous when space around the assembly is limited and/or when assemblies have to be located next to each other.

The routing members may be rigidly connected one to another such that said first housings are in said aligned bank when in respective stowed positions relative to said routing members.

Means may be provided for selectively restricting the amount of movement of each first housing out of alignment with the other first housing in the aligned bank thereof.

This feature may be used to provide (i) ready access for test purposes to that part of the housing in which the fibre connection or connections and the fibres immediately adjacent thereto are accommodated and (ii) selective access to a part of the housing where excess fibre is stored.

Preferably said further housing is aligned with said bank of housings such that said assembly has an elongate configuration of substantially constant cross-section substantially throughout its length.

Advantageously, each conduit means may define a plurality of passages aligned with respective passages of the passage means of the routing member associated therewith. This feature enables individual fibres to be routed through separate passages to the first housings, which facilitates assembly, particularly when assembly utilises the blown fibre technique in which the fibres are blown through respective passages.

Also, each flexible conduit means may extend into the housing associated therewith and split along at least some of its length within the housing into separated tubes.

BRIEF DESCRIPTION OF THE DRAWING

In order that the invention may be well understood, the above-mentioned embodiment thereof, which is given by way of example only, will now be described with reference to the accompanying drawings, in which:

FIG. 8 is a plan view of an alternative housing for the sub-assembly illustrated in FIG. 3.

DESCRIPTION OF THE PREFERRED EMBODIMENT

Figure 1:
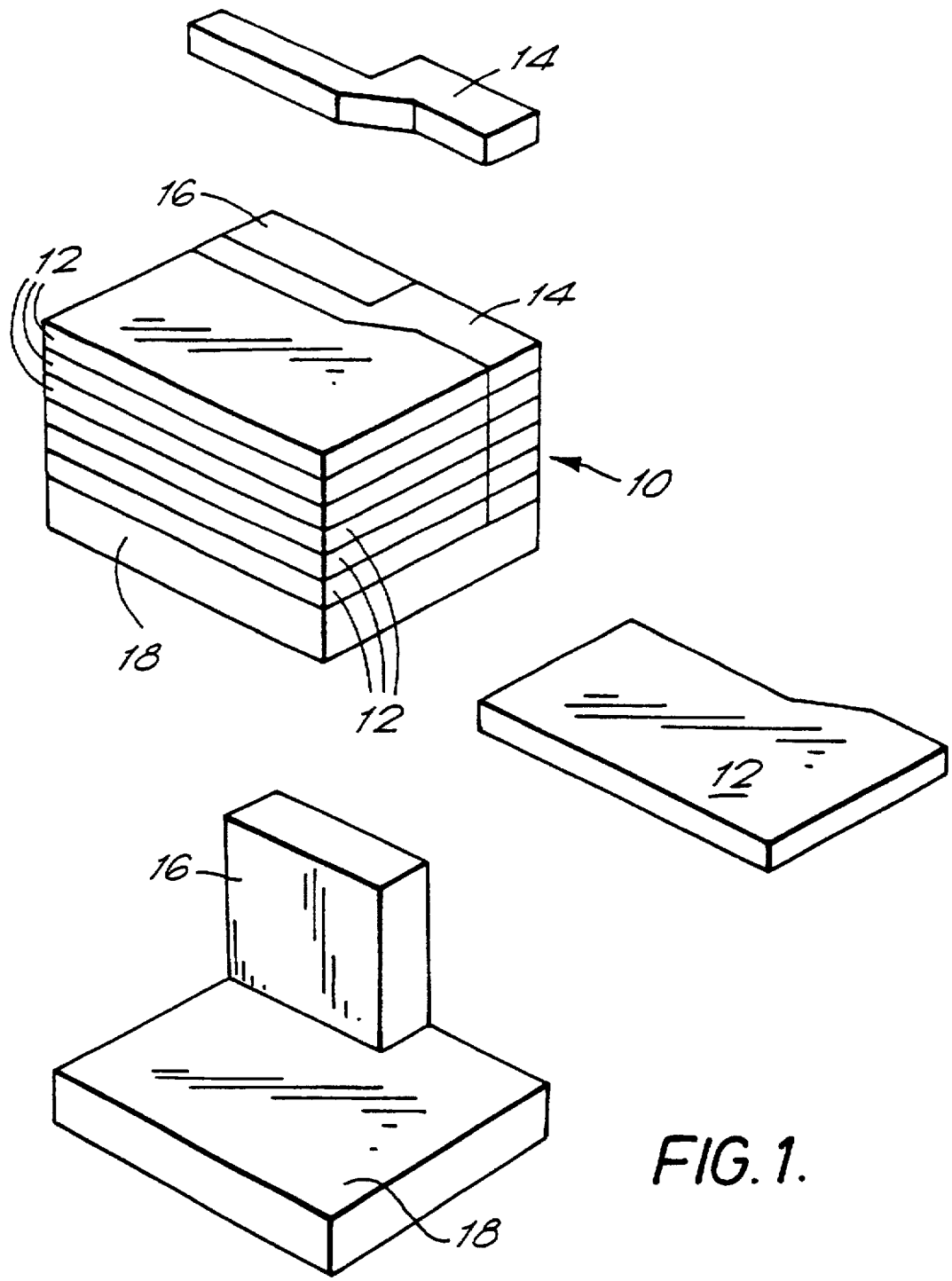
FIG. 1 is a schematic view of an assembly for use in connecting optical fibres to at least one optical device having input and output tails and some major parts of the assembly.

Referring first to FIG. 1, the assembly 10 therein comprises a plurality of housings 12 for housing optical fibre connections. Each housing 12 is pivotally mounted to, and supported by, a respective rigid routing member 14. The routing members are rigidly connected one to another such that the housings are arranged in an aligned bank—in the illustrated example in a stack or tier rather than a row. Each housing is pivotable for providing access thereto from its illustrated stowed position out of alignment with the other housings. The aligned bank of housings 12 are arranged adjacent a manifold 16 and in alignment with a housing 18 for housing at least one passive optical device.

The assembly enables input and output optical tails of the one or more passive optical devices (for example, a splitter having a single input tail and four output tails) in housing 18 to be connected to respective optical fibres carrying signals to or away from the optical device and the connections housed in the housings 12—one or more in each housing. Housing the connections separately from the optical device and locating them in a plurality of housings facilites both installation and maintenance.

Figure 2:
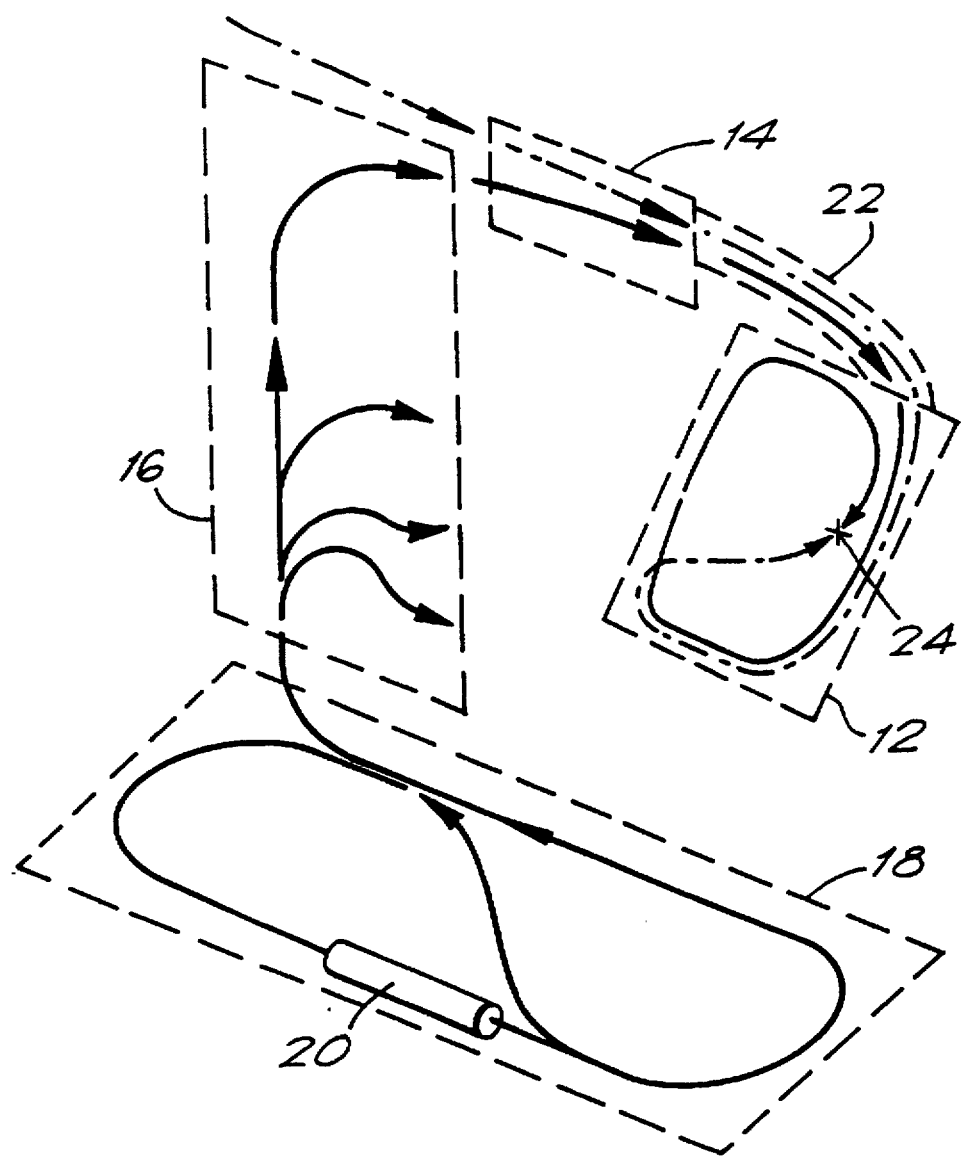
FIG. 2 is a diagram showing fibre routing of the assembly of FIG. 1.

Referring to FIG. 2, the tails of an optical device 20 in housing 18 are routed, as shown in solid line, within that housing, through the manifold 16 to the routing members 14. From each routing member 14 (only one indicated in FIG. 2) the tail or tails routed thereto are routed through a flexible conduit, indicated at 22, to the housing 12 pivoted to the routing member and within that housing. In FIG. 2, the housing 12 illustrated is shown in a position pivoted from its stowed position adjacent the manifold 16. The chain dotted line in FIG. 2 indicates the route of an optical fibre through the routing member 14, flexible conduit 22 and within the housing 12 for connection to an optical tail at location 24.

The tails of the optical device and the optical fibres to be connected to them are guided within the assembly along predetermined paths such that the tails and fibres are not subjected to bending below a predetermined bend radius.

The assembly may be supplied for installation 'prefibred', that is having at least one passive optical device housed in housing 18 with the optical fibre tails thereof routed to the housings 12, as described above, in readiness for connection to optical fibres which are routed to the housings via the routing members and flexible conduits by the installer.

Figure 3:
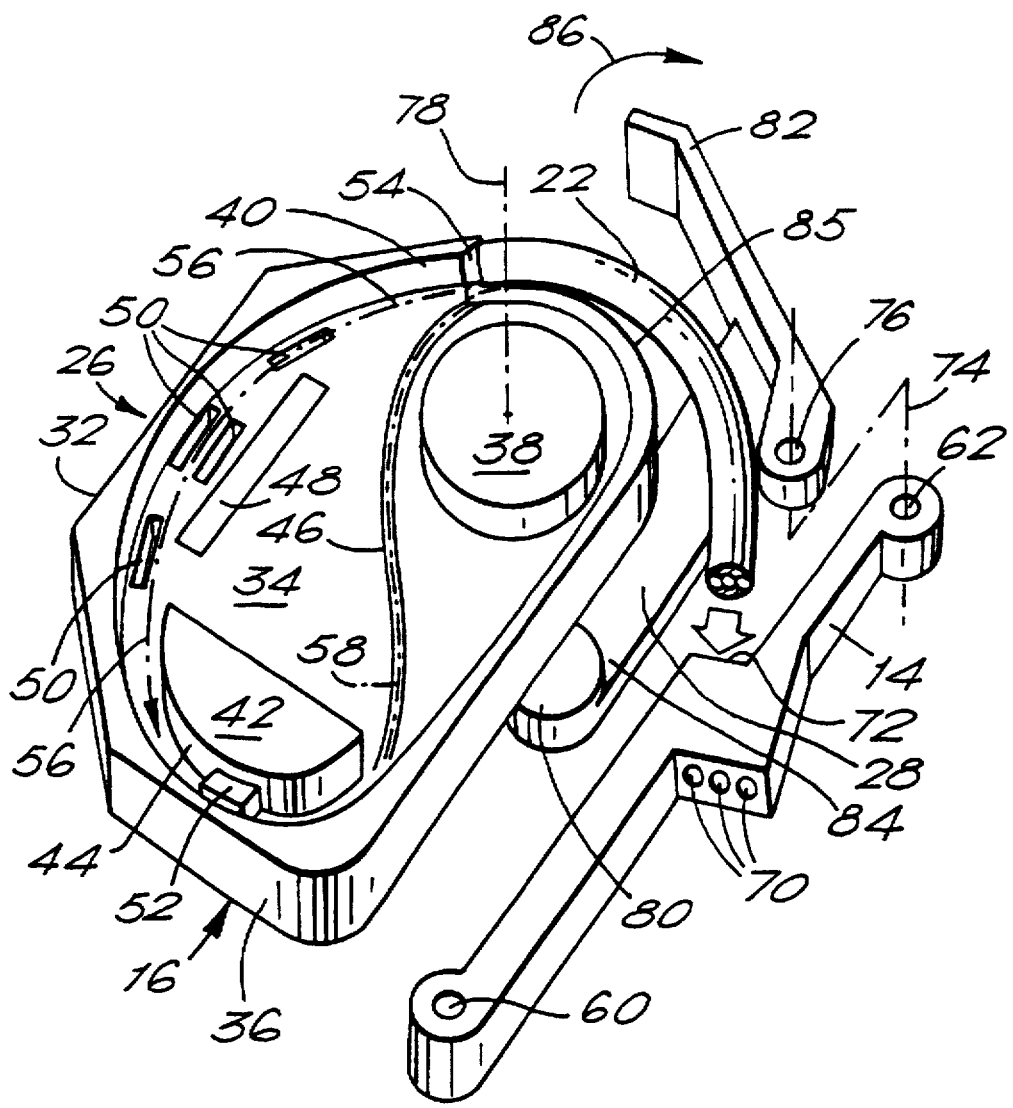
FIG. 3 is a perspective, exploded view of a sub-assembly of the assembly shown in FIG. 1 and comprising a housing for housing two optical fibre connections mounted to a routing member by a pivoting device with a flexible conduit extending between the housing and routing member.
Figure 4:
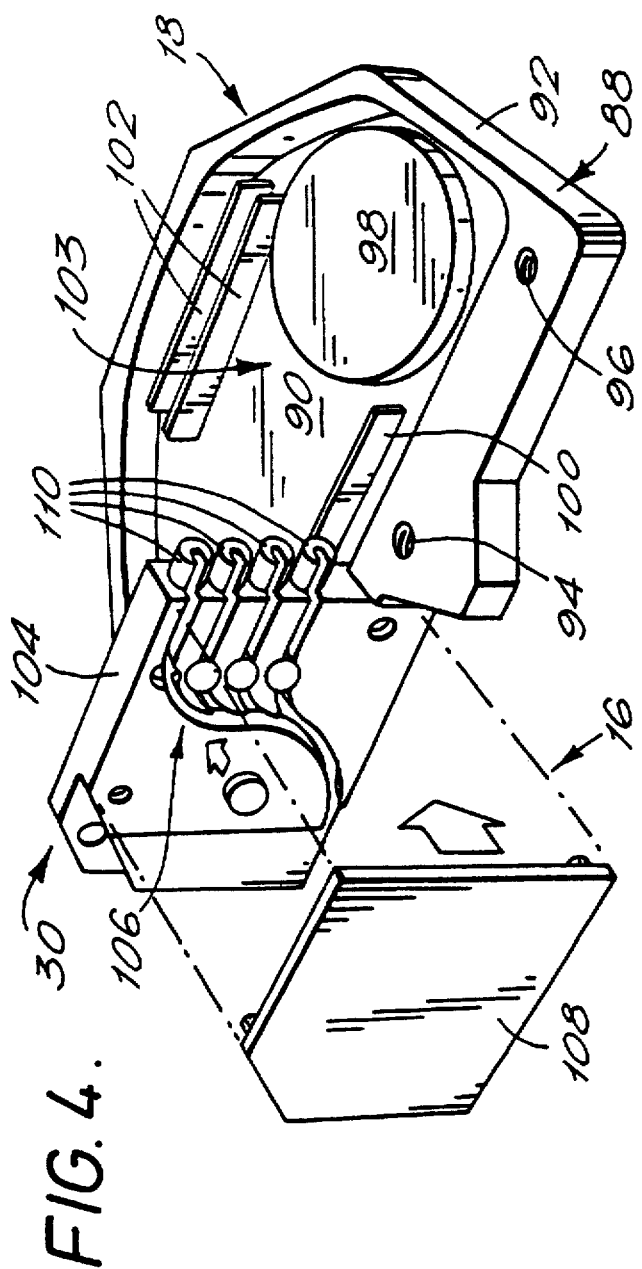
FIG. 4 is a perspective, exploded view of another sub-assembly of the assembly shown in FIG. 1 and comprising a housing for housing a passive optical device and a manifold for routing input and output tails of the device.

In more detail, the assembly comprises (i) a plurality of sub-assemblies 26 illustrated in FIG. 3, each comprising a housing 12 mounted to a routing member 14 by a pivoting device 28 with a flexible conduit 22 extending between the housing 12 and routing member 14 and (ii) a sub-assembly 30 illustrated in FIG. 4 comprising the housing 18 and manifold 16. The sub-assemblies 26 are connected together in alignment in the manner illustrated in FIG. 5 and clamped by the clamping arrangement illustrated in FIG. 6, and the sub-assembly 30 is attached to the clamped together sub-assemblies 26 in alignment therewith.

It will be understood that the assembly may comprise any suitable number of sub-assemblies 26 and therefore have a range of heights. However, as will be appreciated the assembly has an elongate configuration of substantially constant cross-section substantially throughout its length regardless of the number of sub-assemblies 26.

It is also to be understood that with suitable modification to the manifold 16 the housing 18 may be located above housings 12 or amongst them, and also more than one housing 18 may be provided.

In sub-assembly 26, the housing 12 comprises a tray 32 having a base 34, side wall 36 and an open top. The tray 32 may be provided with a lid, or closure which may be hinged to the side wall 36. Within the tray 32 are disposed fibre routing means comprising a cylindrical mandrel 38 disposed at one end 40 of the tray, a guide member 42 having an arcuate side surface 44 disposed at the other end of the tray and an elongated S shaped guide groove 46 extending between the mandrel 38 and guide member 42. The tray also provides a holder 48 for the connection(s) to be housed therein. The illustrated tray holder 48 is adapted to hold two connections, one above the other. The base 34 of the tray is apertured at 50 to provide access to the fibres from beneath the tray as well as the top when the housing is pivoted from its stowed position allowing the use of an optically nonintrusive system for investigating the optical signal travelling to and from a connection.

Preferably, also the tray is provided with a clamp arrangement for clamping the fibre tails and fibres within the tray to prevent them being pulled from the tray in the event of an external tensile force being applied to them. The clamp arrangement in the embodiment comprises an elastomeric gripper pad 52 which is adapted to be urged against the arcuate side surface 44 of the guide member 42 to clamp the optical fibre tails and optical fibres passing between the guide member 42 and the pad 52.

Optical fibres and fibre tails entering the tray at an entry port 54 in the tray side wall 36 follow either the path indicated by the chain dotted line 56 or the double chain dotted line 58 towards the guide member 42 to which they are clamped with pad 52. Then the fibre tails are wound either anti-clockwise or clockwise around the guide member 42 and mandrel 38 to provide an amount of excess fibre within the tray. The ends of one counterclockwise wound fibre or tail and one clockwise wound tail or fibre are then interconnected, for example, by being spliced together in the region of the holder 48. A protective sleeve fitted over the fibre or tail prior to their connection is then slid over the connection and the connection positively located in the holder 48.

It will be appreciated that the excess fibre and fibre tail housed within the tray enables subsequent re-making of the connection. Unused or spare fibres or fibre tails may also be stored within the casing for future use. These fibres/tails may be stored in windings about the mandrel 38 or the mandrel 38 and guide member 42.

Figure 5:
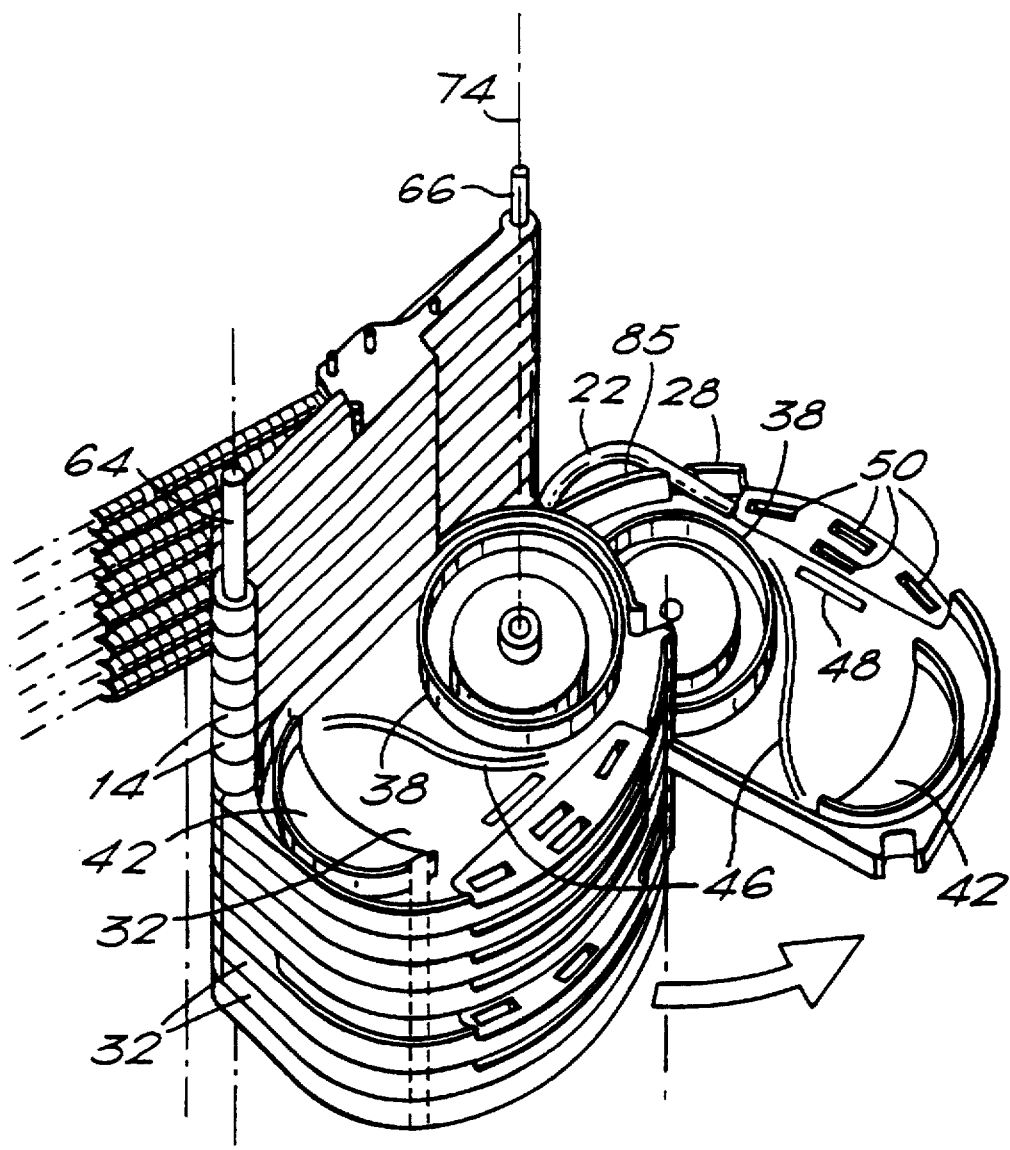
FIG. 5 is an exploded view of a plurality of the sub-assemblies of FIG. 2 connected together with the housing of one sub-assembly moved out of alignment with the other housings, and with parts of the upper sub-assemblies omitted for illustrative purposes.
Figure 6:
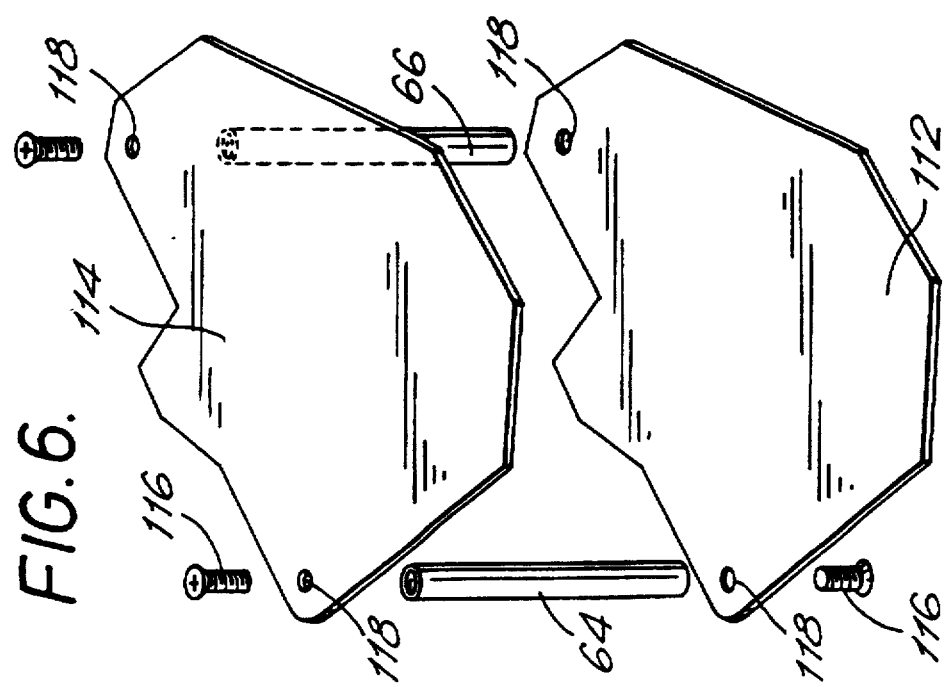
FIG. 6 is a perspective; exploded view of parts of the assembly for clamping sub-assemblies shown in FIG. 3 in alignment.

The routing member 14 to which the housing 16 is pivotally mounted by pivoting device 28 is substantially elongate in configuration with respective through bores 60, 62 at each of its opposed ends to enable a plurality of like routing members to be rigidly connected together by respective through ties 64, 66 indicated in FIGS. 5 and 6. The routing member 14 includes a plurality of passages 70 for routing fibres to the tray 32 via the flexible conduit 22 which extends from an outlet side 72 of the routing member 14 to the inlet port 54 of the tray 32 and comprises a plurality of passages aligned with the passages 70 of the routing member. The conduit 22 may comprise a single tube compartmentalised into a plurality of passages or advantageously a plurality of individual tubes, each defining a passage, either bundled together or joined together along their lengths. Although not illustrated, advantageously the flexible conduit 22 may extend into the tray and be split along at least part of its length within the tray into individual tubes providing protection for the fibres within those tubes.

The pivoting device 28 is pivotally connected to the routing member about a first axis 74 which as illustrated may be coaxial with the axis of bore 62. To this end the pivoting device 28 may have a bore 76 for pivotal mounting of the device on tie 66. The device 28 is pivoted to the tray about a second axis 78 which is parallel to axis 74. The pivotal connection about axis 78 comprises a cylindrical boss 80 provided on the device 28 which is received in a corresponding cylindrical recess (not shown) in the tray base 34 which extends into the mandrel 38. The device 28 is provided with a lever 82 by which the device can be pivoted about axis 74 and a web 84 which extends between the bore 76 and boss 80 to provide a support beneath the tray 32.

The flexible conduit 22 is anchored to the outlet side 72 of the routing member 14 and the inlet port 54 of the tray 32 and acts to control the pivoting movement of the tray when the lever 82 is rotated about axis 74 in the direction of arrow 86. As will be appreciated, the pivoting device 28 pivots about axis 74 with respect to the routing member 14 and the tray 32 pivots about axis 78 with respect to the pivoting device. In this way, the tray 32 not only pivots about axis 74 but also moves away from the routing member 14, whereby, substantially complete access to the tray is achieved on a rotation about axis 74 in the region of 90°. This feature allows like assemblies 10 to be located next to each other with closer spacing than would be the case if the tray were pivoted to the routing member about a single axis necessitating rotation through approximately 180° to provide sufficient access to the tray.

The web 84 of the device 28 supports the tray from beneath whilst the tray is in its stowed position and additionally during pivotal movement by the pivoting device and whilst the tray is in its fully pivoted position as shown in FIG. 5. Thus in tray positions pivoted from the stowed position the web 84 acts as support platform for the tray avoiding the need to use separate fittings to support the tray when it is being worked upon.

The conduit 22 allows the optical fibres/fibre tails therewithin to move during the above-mentioned pivotal movement in such a way that they are not bent below a predetermined bend radius. Also, when the tray is in its stowed position the conduit lies against a curved portion 85 of the tray side wall 36 which defines a minimum bend radius of the conduit and thus the optical fibres/fibre tails therewithin. Also, there is substantially no change in the length of the flexible conduit during pivotal movement of the tray which would cause movement of the fibres/fibre tails within the conduit.

The pivoting device includes means (not shown) for selectively restricting the amount of pivotal movement of each tray out of alignment with the other trays. These means may comprise an abutment member moveable from a retracted position to an extended position on the web 84 for engagement within a slot in the base 34 of the tray 32. The abutment member, which may be actuated by means of a key is arranged to allow only limited pivoting of the tray when in its extended position in engagement with the slot. Such limited pivotal movement would provide access only to the connection holder 48 and the apertures 50. In this way, limited access is provided so that testing of the connections may be carried out without exposing the other contents of the tray to accidental damage or disturbance.

Referring now to FIG. 4, in sub-assembly 30 the housing 18 comprises a tray 88 having a base 90 and side wall 92. The tray is provided with a lid (not shown) which is secured to the top of the side wall, for example, by threaded fasteners in threaded bores 94 and 96. The plan view of the tray 88 is substantially the same as the plan view of a tray 32 and the routing member 14 to which it is mounted when the tray 32 is in a stowed position against the routing member.

Within the tray 88, are disposed fibre routing means comprising a cylindrical mandrel 98 and a linear guide 100 together with means for positively locating a passive optical device, or a plurality of such devices. In the embodiment these locating means comprise two parallel walls 102. The tray 88 may also be provided with clamping means for clamping the tails thereto to prevent them being pulled from the tray. The tray 88 is provided with a region 103 for receiving at least one insert for locating at least one passive optical device and associated optical fibre tails thereof. Such inserts may be configured to match the configuration of the housing of the passive optical device and accordingly a range of inserts for use with passive optical devices with different housing configurations may be provided.

The manifold 16 comprises a plate 104 which provides or supports fibre tracks 106. These tracks 106 may comprise grooves in the surface of the plate 104 or tubes supported on that surface. The tracks 106 are configured to ensure that the optical fibre tails of the optical fibre devices located within tray 88 are routed over predetermined paths to the appropriate routing member 14 and are not subjected to bending below a predetermined bend radius.

A cover plate 108 is provided for preventing access to the fibre tracks 106.

The manifold 16 includes outlet ports 110 which are mechanically connected to respective routing members 14 to ensure that the fibre tracks are aligned with passages 70 of the routing members. As will be appreciated from the above, the fibre tails are routed along predetermined paths within the tray 88 and then through the manifold fibre tracks 106 to the routing members 14.

It will be understood that the height of the manifold and the arrangement of fibre tracks 106 therewithin may vary depending upon the number of trays 32 required in the assembly.

It will be appreciated that the manifold enables individual optical fibre tails to be routed to predetermined trays 32. In this way, advantageously each tray 32 may contain only input tails or only output tails, preferably with trays containing like tails being disposed adjacent each other. It will also be appreciated that the use of the manifold enables the routing of the optical fibre tails to be physically separated from the routing of the optical fibres to be connected to those tails thereby allowing routing of the latter to the trays 32 without causing disturbance to the previously routed optical fibre tails in an assembly which is supplied "pre-fibred".

A plurality of sub-assemblies 26 are clamped together between two end plates 112, 114 shown in FIG. 6 using the ties 64, 66. As will be appreciated from the foregoing description, the ties 64 and 66 pass through the bores 60, 62 of the routing members. In the illustrated embodiment the ties 64, 66 have threaded bores at each of their ends which are engaged by threaded fasteners 116 which pass through apertures 118 in the end plates. The sub-assembly 30 is then attached to the end plates 112, 114 by releasable fixings (not shown) such that the tray 88 is in alignment with the trays 32 and the ports 110 of the manifold are mechanically connected to the routing members 14. This arrangement is particularly useful as it enables the sub-assembly 30 to be readily detached from the clamped together sub-assemblies 26 without disturbing the clamping arrangement and also facilitates pre-fibring of the assembly since the sub-assembly 30 may be pre-fibred before its attachment to the sub-assemblies 26.

It will be appreciated that when supplied in a "pre-fibred" condition, the assembly greatly facilitates the connection of optical fibres to the optical fibre tails of passive optical devices in that the assembly organises the tails so that they are available for connection in respective trays 32, which trays are selectively accessible for making connections to optical fibres which are routed by the installer through the appropriate routing member 14 and the flexible conduit 22 connected thereto. It will, however, also be appreciated that the assembly can be used to facilitate the interconnection of two fibres in a so-called point-to-point link. In this case the two fibres to be interconnected are routed via a routing member 14 and the flexible conduit 22 connected thereto into a tray 32, wound respectively anti-clockwise and clockwise around the guide member 42 and mandrel 38 to provide excess fibre within the tray and connected end-to-end. The thus made connection is then positively located in the holder 48.

Figure 7:
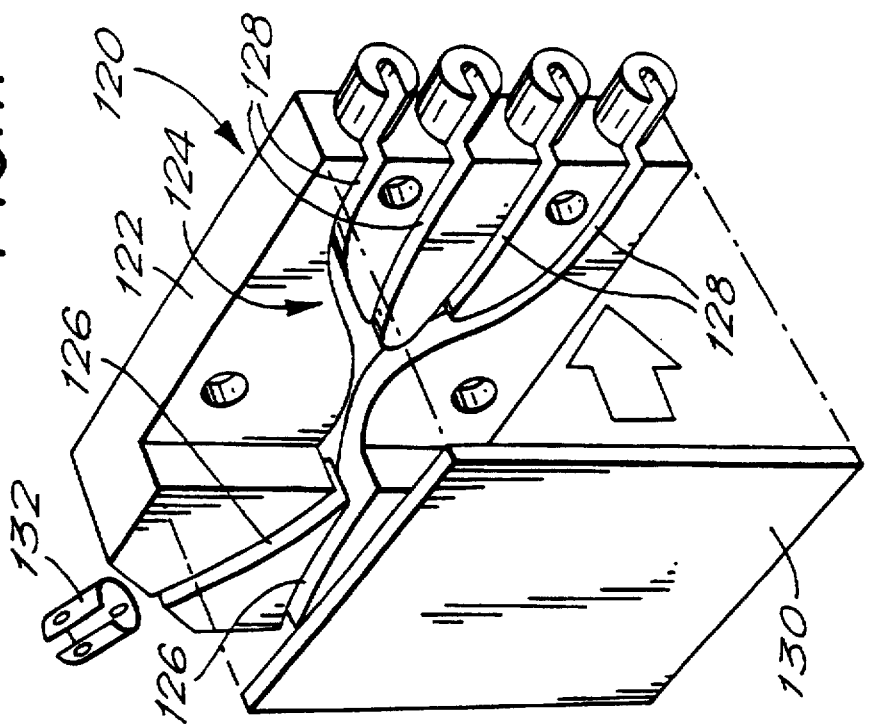
FIG. 7 is a perspective, exploded view of a second manifold for use in the assembly.

A manifold 120 shown in FIG. 7 may be used in conjunction with the rigid routing members 14 when the assembly is to provide for point-to-point fibre connections. The manifold 120 is located in alignment with the manifold 16. The manifold 120 comprises a plate 122 provided with grooves 124 for routing the optical fibres from their cables to respective rigid routing members 14.

As illustrated, the grooves 124 comprise two inlet groove portions 126 and four outlet groove portions 128.

As will be appreciated, the manifold 120 is suitable for use when two cables each comprising four optical fibres are to be connected end-to-end. In this case, the optical fibres of each cable are routed through a respective inlet groove portion 126 and then one fibre from each cable is routed through a respective outlet groove portion 128 to the routing member 14 connected thereto. A cover plate 130 allows access to the grooves 124 to enable the optical fibres to be suitably routed therein, but once secured to the plate 122 prevents such access.

A gripper 132 associated with each inlet groove portion 126 and insertable therein is provided to secure the end of a bend limiting conduit containing the optical fibres at a location within the inlet groove portion 126.

It will be appreciated that point-to-point connections can be made without the use of a manifold such as manifold 120 and instead the optical fibres to be connected may be routed directly into the routing members 14.

Also it will be appreciated that an optical fibre may be routed from one tray 32 to another tray 32 by using a routing element such as a conduit, which may but need not be flexible, extending between respective passages 70 of routing members associated with the trays and having a bend radius above a predetermined value.

Referring now to FIG. 8, parts of the housing 140 shown therein which are similar to the housing 12 shown in FIG. 3 have been given like reference numerals, and will not be further described. The housing 140 comprises a tray 142 provided with a lid, or closure, 144. As illustrated the lid is hinged to the tray sidewall 36, and is shown in an open position allowing access to the whole of the interior of the tray. The lid 144 is provided with storage means shown as a cylindrical compartment 146 for storing unused fibre in a wound configuration. The compartment locates within space in the tray 142 between the mandrel 38 and guide member 42 when the lid is in a closed position, in which position the lid still allows access to the part of the tray in which the connection holder 48 and apertures 50 are located by virtue of the presence of a cut-out 148.

As illustrated in FIG. 8 two optical fibres or tails which are to be connected to two other fibres or tails after entering the tray 142 through inlet port 54 are guided along respective guide grooves 150 across apertures 50a to guide member 42 to which they are clamped using pad 52. Locators 152 to each side of the apertures 50a locate the fibres or tails over those apertures. These fibres or tails are then wound anti-clockwise around guide member 42 and mandrel 38 to provide an amount of excess fibre. The two other fibres or tails to which the above-mentioned fibres or tails are to be connected within tray 142 after entering tray 142 through inlet port 54 are guided around mandrel 38 and by guide groove 46 to guide member 42 to which they are also clamped using pad 52. They are then led to respective guide grooves 154 in which they are guided across apertures 50b to mandrel 38. Locators 156 to each side of apertures 50b locate the fibres or tails over those apertures. These fibres or tails are then wound clockwise around guide member 42 and mandrel 38 to provide an amount of excess fibre. The free end of each clockwise wound fibre/tail is connected to the free end of a respective anticlockwise fibre and the connection located in holder 48. Any optical fibre not required to be connected to another fibre or a tail after entering the tray at inlet port 54 is guided around mandrel 38 and by guide groove 46 to guide member 42 to which it is clamped using pad 52. Thereafter it follows the path indicated by arrow D into the storage compartment 146 where it is stored in a wound configuration having a bend radius above a predetermined value.

In this way spare, unused fibre is stored separately from, and causes no disturbance to, any fibre which is connected to another fibre or tail within the tray.

As will be understood, any such spare fibre may be subsequently used to make a connection within the tray. Also such a spare fibre may be routed, using a flexible conduit to another tray in the same or an adjacent assembly without disturbing the connections already made. The use of the lid is advantageous, not only because it provides extra fibre storage but also because it protects the contents of the tray from mechanical damage when the tray is moved out of alignment with the other trays and also because it provides shielding of light from the cut ends of any fibres stored within the tray.

It is to be understood that whilst reference has been made to housing 18 in the illustrated assembly housing at least one passive optical device, the assembly could be modified so that the housing 18 housed one or more active optical devices such as an optical fibre amplifier.

It will be appreciated that an important advantage of the assembly described herein is that further sub-assemblies 26 may be added to existing sub-assemblies in the assembly, in alignment therewith, to expand the capacity of the assembly and/or the sub-assemblies 26 already in the assembly may be re-arranged to suit requirements.

We claim:

1. An assembly for use in connecting optical fibres to at least one optical device having input and output tails, comprising first housings for housing connections between the optical fibres and tails, a further housing having means for locating therein said at least one optical device, and routing means for guiding said optical fibre tails from said further housing to said first housings, said routing means including a manifold device providing tracks for routing said tails between said further housing and said first housings over predetermined paths, said first housings being arranged in an aligned bank adjacent said manifold device with each first housing being moveable out of such alignment with the others for providing access thereto.

2. An assembly as claimed in claim 1, wherein each of said first housings is mounted to a respective routing member having passage means for routing thereto fibre tails from said manifold device and optical fibres to be connected to said tails in said first housing.

3. An assembly as claimed in claim 2, wherein said routing members are rigidly connected one to another such that said first housings are in said aligned bank when in respective stowed positions relative to said routing members.

4. An assembly as claimed in claim 2 or 3, wherein each first housing is pivotally mounted to its respective routing member for movement into and out of alignment with the other first housings in said aligned bank, a respective flexible conduit means being provided between each said routing member and associated first housing for routing optical fibres and optical fibre tails therebetween and having a predetermined minimum bend radius during such pivotal movement.

5. An assembly as claimed in claim 4, wherein each first housing is pivotally mounted to its respective routing member by a pivoting device which is connected for movement relative to said routing member and said first housing by first and second connections respectively, at least one of said connections being a pivotal connection.

6. An assembly as claimed in claim 5, wherein both connections are pivotal with the axis of the first pivotal connection being parallel to the axis of the second pivotal connection.

7. An assembly as claimed in claim 6, wherein each pivoting device includes a support means between said connections extending beneath the housing associated with the pivoting device for supporting the housing.

8. An assembly as claimed in claim 5, wherein each pivoting device includes a support means between said connections extending beneath the housing associated with the pivoting device for supporting the housing.

9. An assembly as claimed in claim 4, wherein each said flexible conduit means defines a plurality of passages aligned with respective passages of the routing member associated therewith.

10. An assembly as claimed in claim 9, wherein each flexible conduit means extends into the housing associated therewith and split along at least some of its length within the housing into separated tubes.

11. An assembly as claimed in claim 1, having said at least one optical device housed in said further housing with the optical fibre tails thereof routed via said routing means to said first housings.

12. An assembly as claimed in claim 1, wherein said further housing is aligned with said bank of housings such that said assembly has an elongate configuration of substantially constant cross-section substantially throughout its length.

13. An assembly as claimed in claim 1, wherein each of said first housings for housing optical fibre connections comprises a closure provided with storage means for storing fibre in a wound configuration.

14. An assembly as claimed in claim 1, comprising means for selectively restricting the amount of movement of each first housing out of alignment with the other first housing in the aligned bank thereof.

* * * * *